United States Patent
Wang et al.

(10) Patent No.: US 12,231,801 B2
(45) Date of Patent: Feb. 18, 2025

(54) MEETING VIDEO FEED FUSION

(71) Applicant: Lenovo (Singapore) Pte. Ltd., Singapore (SG)

(72) Inventors: Mengnan Wang, Chapel Hill, NC (US); John W Nicholson, Rougemont, NC (US); Daryl C Cromer, Raleigh, NC (US); Howard Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 293 days.

(21) Appl. No.: 17/710,645

(22) Filed: Mar. 31, 2022

(65) Prior Publication Data

US 2023/0308602 A1    Sep. 28, 2023

Related U.S. Application Data

(63) Continuation-in-part of application No. 17/701,958, filed on Mar. 23, 2022.

(51) Int. Cl.
*H04N 5/265* (2006.01)
*H04L 65/403* (2022.01)
*H04N 5/262* (2006.01)
*H04N 23/698* (2023.01)

(52) U.S. Cl.
CPC ........... *H04N 5/265* (2013.01); *H04L 65/403* (2013.01); *H04N 5/2628* (2013.01); *H04N 23/698* (2023.01)

(58) Field of Classification Search
CPC .... H04N 5/265; H04N 5/2628; H04N 23/698; H04N 7/147; H04N 7/15; H04L 65/403; H04L 65/1089; H04L 65/765

USPC ................................................. 348/14.08, 36
See application file for complete search history.

(56) References Cited

U.S. PATENT DOCUMENTS

| | | | |
|---|---|---|---|
| 2015/0116451 A1* | 4/2015 | Xu ........................ | H04N 23/90 348/14.13 |
| 2015/0195489 A1* | 7/2015 | Sobti ...................... | H04N 7/142 348/14.08 |
| 2021/0400142 A1* | 12/2021 | Jorasch ............... | H04L 65/1069 |
| 2022/0070371 A1* | 3/2022 | Bushman ............... | G06F 3/165 |
| 2022/0070412 A1* | 3/2022 | Aikawa .............. | H04N 21/4728 |

(Continued)

*Primary Examiner* — Thai Q Tran
*Assistant Examiner* — Stephen R Smith
(74) *Attorney, Agent, or Firm* — FERENCE & ASSOCIATES LLC

(57) ABSTRACT

One embodiment provides a method, the method including: receiving, at a remote video feed fusion system, an indication of a meeting facilitated through a meeting application allowing access to participants in a location other than a location of a host of the meeting and supporting video transmissions between connected participants; identifying, using the remote video feed fusion system, a plurality of devices each having at least one image capture device and within the location of the host; capturing, using the remote video feed fusion system, a plurality of video feeds of the location of the host using the plurality of devices; creating, using the remote video feed fusion system, a fused video feed of the location of the host from the plurality of video feeds; and transmitting, using the remote video feed fusion system, the fused video feed to at least one participant accessing the meeting from a location other than the location of the host.

18 Claims, 5 Drawing Sheets

(56) References Cited

U.S. PATENT DOCUMENTS

| | | | |
|---|---|---|---|
| 2022/0109822 A1* | 4/2022 | Winter | H04N 23/695 |
| 2023/0269283 A1* | 8/2023 | Chun | H04L 67/025 |
| | | | 709/231 |

* cited by examiner

MEETING VIDEO FEED FUSION

BACKGROUND

With the increase in remote working and globalization of industries and other entities has come an increase in the use of mixed meetings. Mixed meetings are meetings where some participants are co-located in the same physical location and other participants are located in at least one different physical location. Generally, the primary location of the meeting is the location having the participants that are co-located in the same physical location. This is the host location. The participants located in a different physical location are referred to as remote participants. In some mixed meetings, video is transmitted at least from the host location to the remote participants and may also be transmitted from the remote participants to the host location. Thus, the remote participants can view the host location, the participants in the meeting, and any information or devices that are being shared, for example, a smart board, presentation, white board, easel, and/or the like.

BRIEF SUMMARY

In summary, one aspect provides a method, the method including: receiving, at a remote video feed fusion system, an indication of a meeting facilitated through a meeting application allowing access to participants in a location other than a location of a host of the meeting and supporting video transmissions between connected participants; identifying, using the remote video feed fusion system, a plurality of devices each having at least one image capture device and within the location of the host; capturing, using the remote video feed fusion system, a plurality of video feeds of the location of the host using the plurality of devices; creating, using the remote video feed fusion system, a fused video feed of the location of the host from the plurality of video feeds; and transmitting, using the remote video feed fusion system, the fused video feed to at least one participant accessing the meeting from a location other than the location of the host.

Another aspect provides an information handling device, the information handling device including: a plurality of devices, each having at least one image capture device; a processor operatively coupled to the plurality of devices; a memory device that stores instructions that, when executed by the processor, causes the information handling device to: receive, at a remote video feed fusion system, an indication of a meeting facilitated through a meeting application allowing access to participants in a location other than a location of a host of the meeting and supporting video transmissions between connected participants; identify, using the remote video feed fusion system, the plurality of devices within the location of the host; capture, using the remote video feed fusion system, a plurality of video feeds of the location of the host using the plurality of devices; create, using the remote video feed fusion system, a fused video feed of the location of the host from the plurality of video feeds; and transmit, using the remote video feed fusion system, the fused video feed to at least one participant accessing the meeting from a location other than the location of the host.

A further aspect provides a product, the product including: a computer-readable storage device that stores executable code that, when executed by a processor, causes the product to: receive, at a remote video feed fusion system, an indication of a meeting facilitated through a meeting application allowing access to participants in a location other than a location of a host of the meeting and supporting video transmissions between connected participants; identify, using the remote video feed fusion system, a plurality of devices each having at least one image capture device and within the location of the host; capture, using the remote video feed fusion system, a plurality of video feeds of the location of the host using the plurality of devices; create, using the remote video feed fusion system, a fused video feed of the location of the host from the plurality of video feeds; and transmit, using the remote video feed fusion system, the fused video feed to at least one participant accessing the meeting from a location other than the location of the host.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
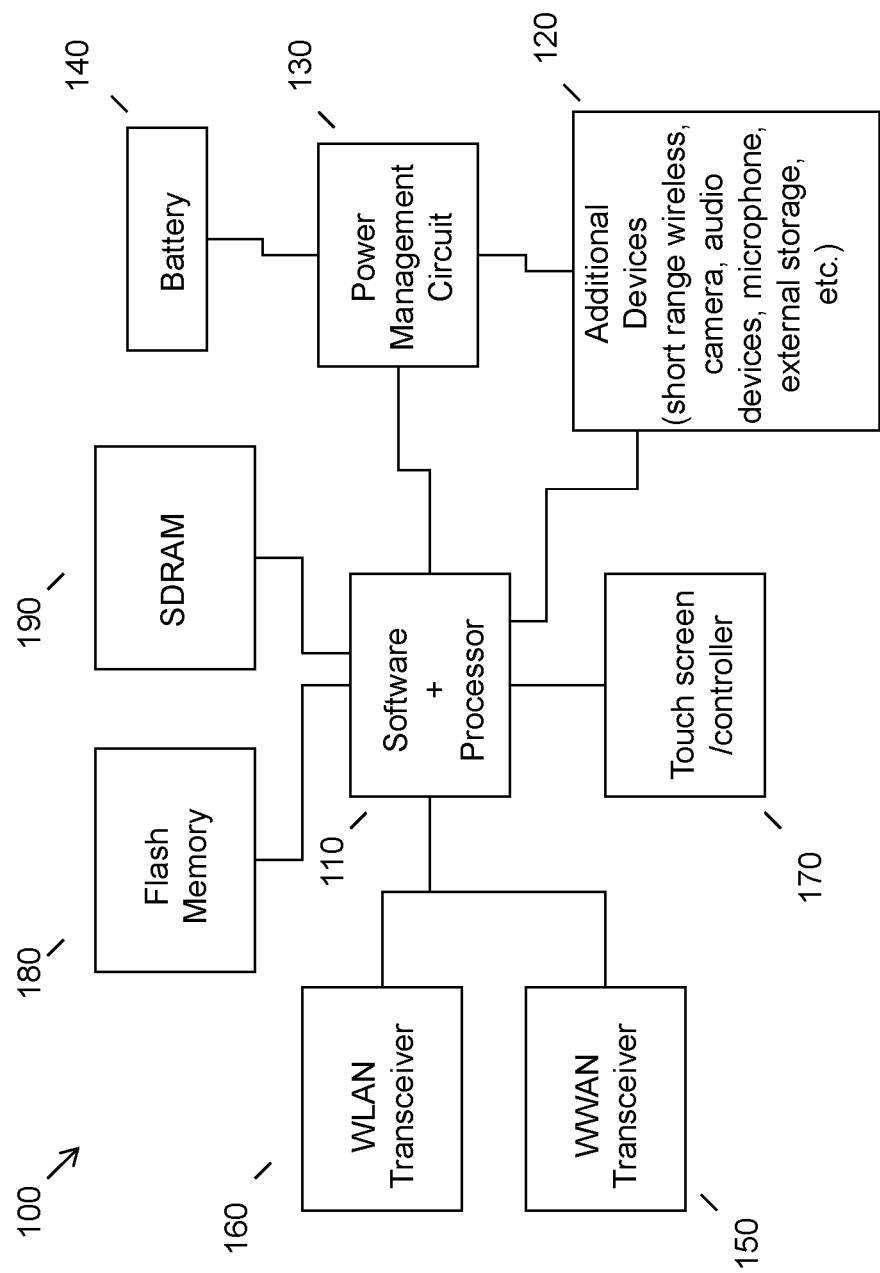
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In standard mixed meetings the video feed that is transmitted to the remote participants is fixed by the host location. In other words, the host location selects an image capture device and corresponding video feed from the selected image capture device to be transmitted to the remote participants. When the host location wants to share different information or a different video feed, the host location selects a new image capture device and corresponding video feed as the transmitting device. There may also be other video feeds that are viewable by the remote participants. However, these video feeds are typically video feeds of other remote participants. In other words, for each of the participant locations a video feed may be generated and transmitted. These may be viewable by all of the locations. However, each participant location generally has a single video feed that is transmitted to the remaining participants and the video feed is selected by the location transmitting the video. Thus, the remote participant generally does not have control over what part of the location is viewable by the remote participant.

Some participant locations may be outfitted with a 360° view camera that captures video feed of the entire physical space. This allows the remote participant to pan, tilt, and zoom around the video giving the participant flexibility to view anything within the location. However, the 360° cameras are very bulky and take up a significant amount of space. Additionally, the camera has to be located in a central location so that the entire space can be captured, which means the camera is typically located on the conference table, thereby taking up valuable meeting space. When users do not need the camera, for example, they are not transmitting video feed to remote participants, the camera frequently gets moved from the space, which means it has to be moved back to the original location when a new meeting is started that does have remote participants. Additionally, these 360° cameras are typically expensive making them cost prohibitive in many situations.

There are some conventional solutions that can take video received from multiple standard and/or panoramic cameras and stitch the video together to make a single video feed that appears as a panoramic or 360° video feed. This gives the remote participant the same freedom as the single 360° camera with respect to viewing different views within the location. However, in order for the system to accurately stitch the video feeds together, the cameras have to have a known fixed location and angle, and also be stationary so they do not move during the video capture. Movement of the camera would result in the system being unable to accurately stitch the video feed together.

Accordingly, the described system and method provides a technique for creating a fused video feed from video feeds captured from a plurality of devices within a meeting location to be transmitted to remote or virtual participants of the meeting. The remote video feed fusion system receives an indication of a meeting facilitated through a meeting application that allows access to participants in a location other than a location of a host of the meeting (referred to as remote participants) and supporting video transmissions between connected participants. In other words, the meeting application is one that can be used to virtually connect participants located in different physical locations and also is able to transmit video between the meeting participants.

The system identifies a plurality of devices within the location of the host that each have at least one image capture device. These devices may be user devices, for example, tablets, laptops, personal computers, smart phones, smart watches, and/or the like, or may be devices that are set up in the meeting location, for example, a processing system that is used to facilitate the meeting through an entity, cameras set up in fixed locations within the location, devices that are associated with the location, and/or the like. The system captures video feeds from each of the devices. From these captured videos, the system creates a fused video feed of the location and transmits the fused video feed to the remote participants, thereby giving the remote participants a panoramic or 360° video feed.

Therefore, a system provides a technical improvement over traditional methods for transmitting video to virtual participants of a meeting. Since the described system and method utilizes any device capable of capturing video within a location and stitch the video feed together, the described system provides a technique that is significantly less expensive and bulky than conventional 360° cameras, while still providing the same panoramic or 360° video feed. Additionally, since the described system performs an analysis on the video content to determine how to stitch the video feeds together, the described system does not rely on cameras or other image capture devices that have to be stationary and have known and fixed locations and angles within the location. Thus, the described system provides a system that is more flexible, cost-effective, and space-saving than conventional techniques, while still providing a video feed to remote participants that allows the remote participants the freedom to view anything within the location.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
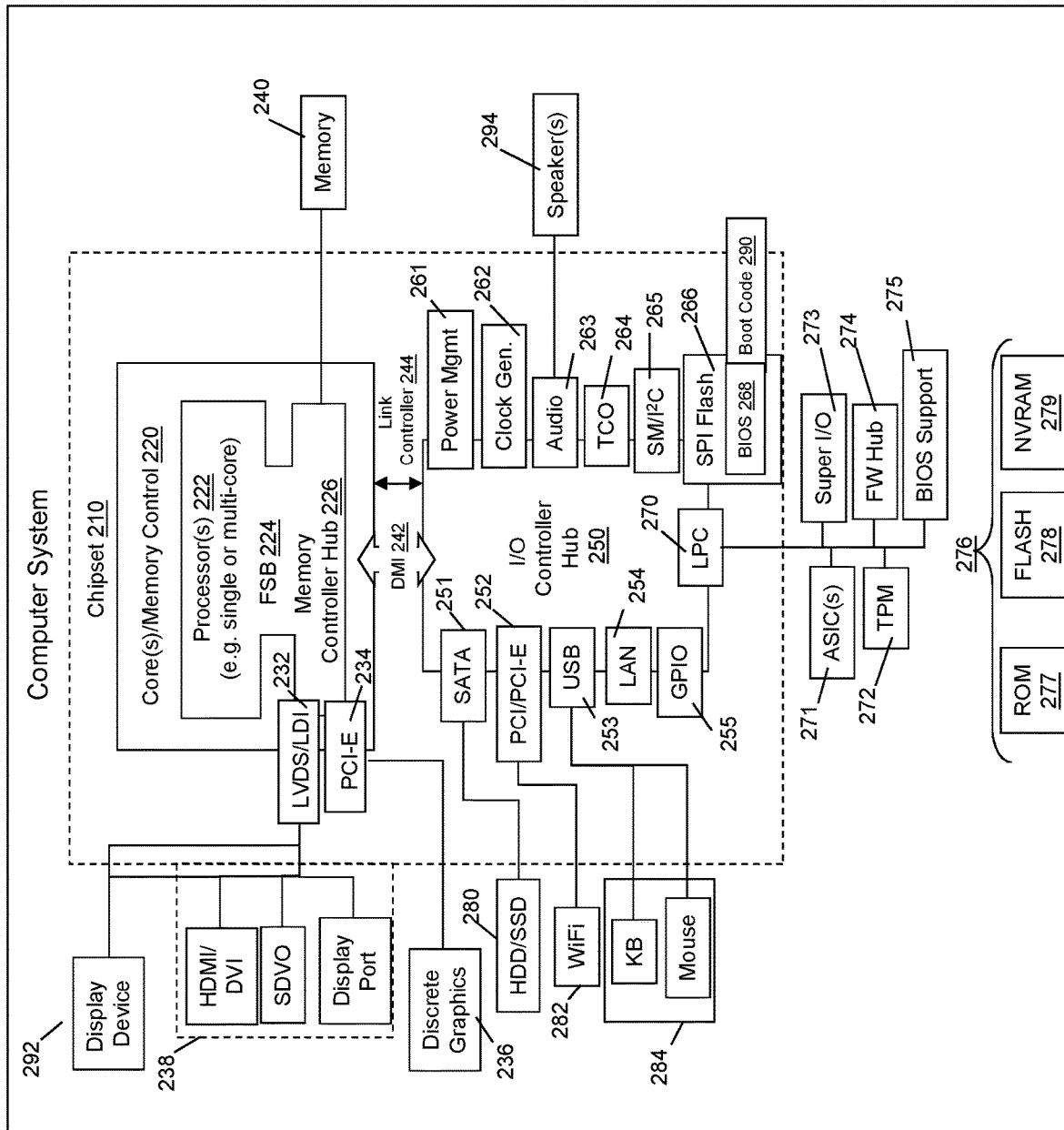
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems that create fused video feeds from video feeds of a plurality of devices. For example, the circuitry outlined in FIG. 1 may be implemented in a tablet or smart phone embodiment, whereas the circuitry outlined in FIG. 2 may be implemented in a personal computer embodiment.

Figure 3:
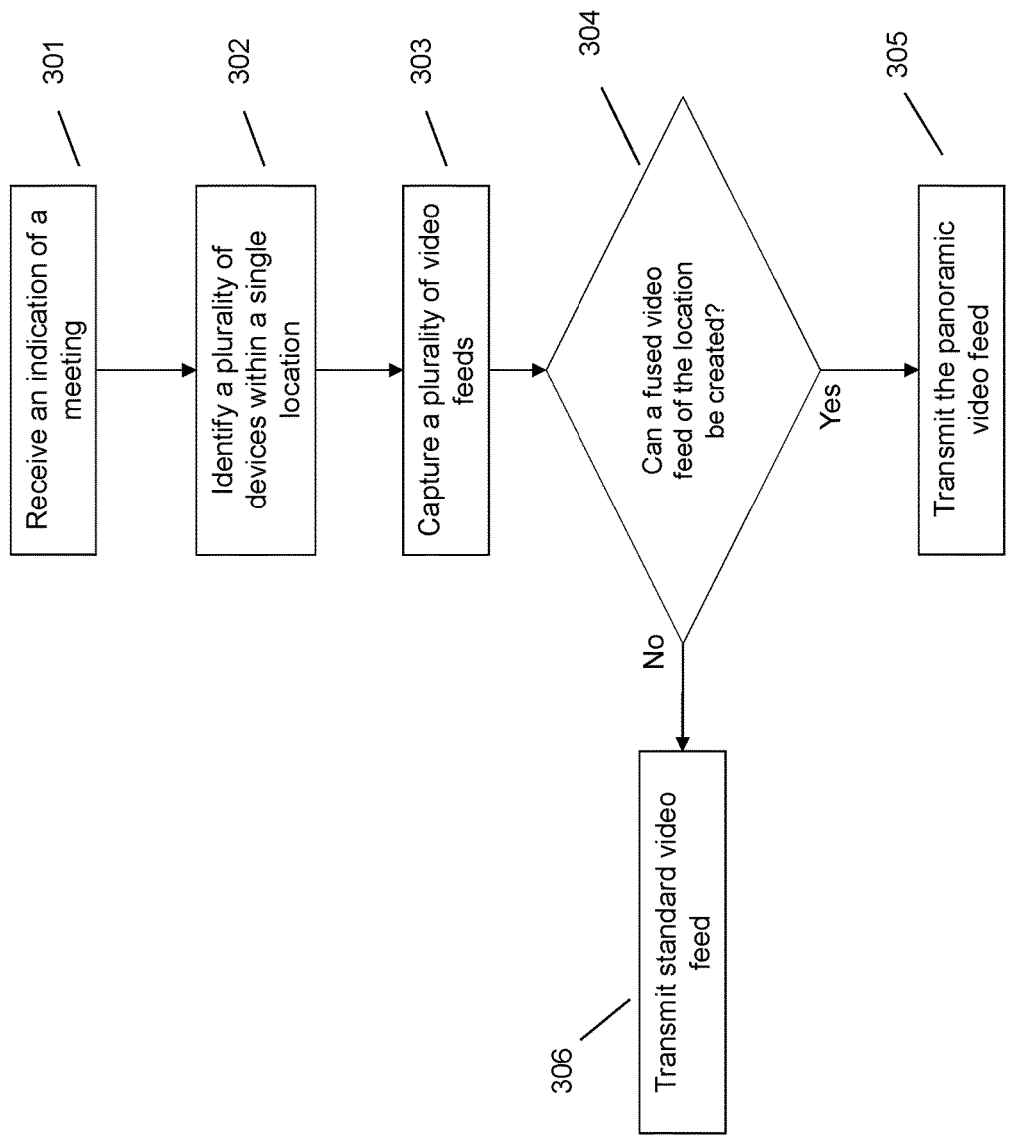
FIG. 3 illustrates an example method for creating a fused video feed from video feeds captured from a plurality of devices within a meeting location to be transmitted to remote participants of the meeting.

FIG. 3 illustrates an example method for creating a fused video feed from video feeds captured from a plurality of devices within a meeting location to be transmitted to remote or virtual participants of the meeting. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to create a fused video feed from a plurality of video feeds. Additionally, the remote video feed fusion system includes modules and features that are unique to the described system.

At 301, the remote video feed fusion system receives an indication of a meeting facilitated through a meeting application and that allows access to participants in a location other than a location of a host of the meeting and that supports video transmissions between connected participants. For ease of readability, the term "host" will refer to one of the meeting participants that corresponds to a physical location having more than one participant in the location. Generally, the host will be the person or entity presenting the main or primary video feed, but other participants could present a main or primary video feed also. Additionally, since meeting applications allow different participants to become the host or presenter, the host may change throughout the meeting, particularly if more than one physical location has more than one meeting participant at the physical location. Thus, the term "host" is relative to the location having more than one participant in a single location and that employs the described system and method.

On the other hand, participants who are located in a physical location other than the location of the host, will be referred to as remote participants. Again, since the host may change throughout a meeting, the remote participants may also change throughout a meeting. In other words, at some point during the meeting a host may become a remote participant and a remote participant may become a host. Remote participants may include locations having more than one participant and locations having a single participant. Additionally, different physical locations do not have to mean that participants are located in completely different physical locations. For example, participants can be located in the same building, but different rooms. On the other hand, different physical locations may mean participants who are geographically located on opposite sides of an ocean. Finally, while a meeting is referred to herein, this is not intended to limit the scope of this application to only a meeting or some definition of a meeting. Rather, the described system can be used in any application having a group of users located in one location communicating with at least one other user located in a different location and where the communication includes video.

The indication of a meeting may be via the activation of a meeting application, or some other type of communication application, that supports video and that allows communication between two or more users and/or locations. The meeting application may be a commercially available meeting application, a meeting application proprietary to an entity associated with the meeting, and/or the like, that supports video transmissions between participants located in different physical locations. The indication of a meeting may also be the start or activation of a video feed from a location having a plurality of participants. Thus, the meeting or other type of communication without video may already be occurring. The remote video feed fusion system may identify the activation of the video during the meeting as the indication of the meeting. Since the described system focuses on video, meetings occurring without at least one participant transmitting video will not benefit from the described system and method. Thus, the system may wait for the video feed to be activated.

At 302, the remote video feed fusion system identifies a plurality of devices, each of the plurality of devices having at least one image capture device and located within the location of the host. In other words, the system identifies one or more devices in the room or other location that have image capture devices (e.g., cameras, webcams, video recorders, etc.). The devices may be user devices, for example, smart phones, tablets, laptops, personal computers, smart watches, and/or the like. The devices may also be dedicated location devices, for example, stationary cameras, webcams, computing systems, meeting devices having cameras (e.g., smart board, presentation stand, desk-facing camera, etc.), security cameras, and the like. Thus, it should be noted that the device having at least one image capture device may be a stand-alone camera that has no other processing capabilities other than those provided on a camera. On the other hand, the device having at least one image capture device may be a participant's personal smart phone that has multiple cameras. The plurality of devices may also be a combination of user devices and other devices.

The identified devices do not necessarily have to be registered with the system, although registering or authorizing the device with the system is possible. Rather, the system can identify a device use one or more device detection techniques. One detection technique is through the use of communication connections of the device to the system or other devices that are operatively coupled to the system, for example, routers, near-field communication devices, hotspots, conferencing or meeting devices, and/or the like. The system can detect the communication connection and identify the device. From the device identification, the system can identify attributes of the device, including whether the device includes an image capture device, the corresponding user or owner of the device, whether permissions for accessing the camera are authorized, and/or the like.

The devices may also be identified based upon a connection to the meeting application. Each participant within a location may connect to the meeting application even if the participant is not connecting as a separate participant. In this case, the device is known to the meeting application but is not displayed as a separate participant within the meeting. It is common to have knowledge of other devices in a single location in meetings with more than one participant in a physical location so that any of the participants can use their own device to present information from the device to the other participants within the meeting. When connecting to the meeting application the participant can be requested to allow access to the images and/or image capture device of the device being connected to the meeting. Additionally, or alternatively, the user may not take steps to connect to the meeting application, but instead the meeting application can recognize the other devices, which still allows the devices to be used to present information within the meeting, if desired by the participants.

Devices may also be identified through other devices. As one device is recognized by the system, meeting application, and/or the like, the device may be in communication with another device that is not directly recognized by the system, meeting application, and/or the like. Through the recognized device, the system can identify the other device. Thus, the system can identify and access indirect devices. For example, a user may access the meeting application using a laptop computer. The laptop computer may be connected to a smart phone of a user, where the smart phone is connected to a smart watch of the user. The laptop computer, which is recognized by the system via the meeting application, provides identification of the smart phone, which in turn provides identification of the smart watch. Thus, in this example, through the laptop computer, the system recognizes and has access to the laptop computer, smart phone, and smart watch of the user. These are not intended to be limiting examples, as other techniques for identifying devices are contemplated and possible. For example, the system may identify devices from the user registering the device with the system and/or meeting application, from the user providing a beacon from the device to be recognized by the system, and/or the like.

Upon identifying the devices, the system may request permission from the device and/or the user to access the images and/or image capture devices on the device. While some image and/or image capture device access may be automatic or granted as terms of accessing the system or meeting application, thereby not requiring authorization, some image and/or image capture device access may not be automatic. For example, when devices are being accessed indirectly from the system or meeting application, permission from the user of the device may be needed. As another example, even if the user does connect to the system or meeting application, the user may still be prompted to grant permission for the system or meeting application to access images and/or image capture devices of the device. Thus, the system may prompt the user to authorize the system to access images and/or image capture devices of the device, which may be facilitated through the meeting application. The user may then allow or deny the request for access. The authorization of access may have different conditions, for example, the authorization may be granted for a particular length of time, particular number of accesses, to particular folders or particular image capture devices, particular location, particular user, and/or the like.

At 303 the remote video feed fusion system captures a plurality of video feeds of the location of the host using the identified plurality of devices. In other words, the system captures a number of different video feeds of the location using the accessed image capture devices. As can be understood since the devices may be any type of device having one or more image capture devices, the video feeds may be drastically different between devices. Specifically, attributes of the video feeds may differ between devices depending on the type of device, type of image capture device, and/or the like. Some attributes that may vary between different devices include, but are not limited to, field of view, resolution, saturation, image coloring, image and/or file size, display ratio, frame rate, quality, and/or the like.

Additionally, since some of the devices may be user devices, not only may the exact position and angle of the device and image capture device within the room not known or not previously known to the system, as required by conventional systems, but also the position and angle of the device and image capture device is dynamic, meaning it can move throughout capture of the video feed. Thus, unlike conventional systems which require a fixed, known location of image capture devices to be able to fuse video, the described system is able to capture and utilize video feeds from devices that do not have a known position and that are not necessarily fixed in their position within the location. However, the system may also utilize devices having image capture devices that have known and/or fixed positions within the location.

At 304 the system determines whether a fused video feed of the location can be created. In other words, the remote video feed fusion system attempts to create a fused video feed of the location of the host from the plurality of video feeds. To create the fused video feed, the system stitches together the video feeds received from the plurality of devices. As previously mentioned, video feeds received from different devices may have different attributes. Thus, in stitching together the video feeds, the system first ignores the attributes of the video feeds and only identifies and utilizes the content of the video feeds. In other words, the system ignores the video feed attributes and only uses the content of the video feed when creating the fused video feed. This allows the system to fuse together video feeds that have different attributes.

To stitch the video feeds together, the system has to identify areas of the video that should/can be stitch together. In other words, the system is attempting to make a video feed that appears to be a single continuous image. Accordingly, the system identifies video feeds that should be stitched together to result in this single continuous image. One technique that may be utilized is using one or more image analysis techniques to identify image areas of overlap between two or more of the video feeds. In this technique, the system analyzes the images within the video feed to identify pieces in the images that match each other, thereby indicating that each of the video feeds captured the same area, even if the rest of the image is of different areas. The areas of overlap between two or more videos may be any amount of overlap including a majority of the images and a very small fraction of the images. It should be noted that since the images are being captured from different devices, some video feeds may be received at slightly different times than other video feeds. Thus, the system may use a timestamp of the video feeds to correctly identify frames occurring at the same time within the video feeds and stitch together these frames instead of frames that occur at different times.

Another technique for determining image areas of the video feeds to be stitched together includes identifying one or more attributes of the devices providing the video feeds. While the attributes of the devices may not be previously known to the system, may not be fixed, and may change during the course of the video feed, the attributes may be monitored in real-time and utilized to identify information about the video feed provided by a device. For example, the system may receive information from each device regarding a position of the device, a positioning of the device (e.g., angle, movement, etc.), and/or the like.

The position of the device may be detected using one or more techniques. Since the position of the device within a location is unknown and is dynamic, meaning it can change, the system may utilize one or more distance calculation algorithms based upon known positions of other devices within the location, for example, a system router, a system computing system, fixed cameras or devices, and/or the like. The distance calculations, for example, time of flight, time distance of arrival, received signal strength indicator, angle of arrival, and/or the like, can provide position information using signals transmitted by the device, for example, wireless communication signals, the video transmissions, and/or the like. The signals can be used to triangulate the position of the device with the location. A positioning of the device may be detected using sensors of the device (e.g., gyroscope, proximity sensors, accelerometer, hinge sensors, etc.) and transmitted to the system. Other and a combination of position and positioning identification techniques may be utilized.

Using the attributes of the device allows the system to determine what field of view within the location the video is capturing. The system can then use the field of view knowledge to identify what video feeds should be stitched together and where within the video feed the video feeds overlap or should be stitched together. A combination of techniques may be utilized in stitching the video feeds together and creating the fused video feed. It should also be noted that the plurality of devices is unable to or do not capture every single portion of the location. In this case, the system may either create a video feed having a smaller field of view, for example, a wide panoramic instead of a full 360° view, or may fill in missing portions of the video feed with filler, or a combination thereof. The system may select the technique to utilize based upon how much of the location is missing. For example, if only a small portion or portions identified as unimportant are missing, the system may use a filler technique. On the other hand, if large portions of the location or portions identified as important (e.g., locations including people, locations which would result in an obviously broken image, etc.) are missing, the system may use a smaller field of view technique.

If the system determines that a fused video feed of the location cannot be created at 304, the remote video feed system may transmit a standard or traditional video feed to the remote participants at 306. This may occur when the system determines that not enough video feeds can be captured to create a fused video feed, a problem occurs in the video processing and creation step, and/or the like. On the other hand, if a fused video feed can be created at 304, the system transmits the fused video to at least one participant accessing the meeting from a location other than the location of the host at 305. In other words, the system transmits the fused video feed to the remote participant at 305. Since the fused video feed is being transmitted to remote participants of a meeting, it should be noted that the capturing of the video feeds from the devices, creation of the fused video feed, and transmission of the fused video feed occur in substantially real-time as the meeting is occurring. In other words, the fused video feed is able to be transmitted during the meeting so that the remote participants can participate in the meeting as it is occurring.

The fused video feed may be a panoramic or 360° video feed of the location. This allows a remote participant to zoom, tilt, pan, and/or otherwise modify the view of the received video feed as if the remote participant were in the host location. In other words, the fused video feed provides the benefits provided by a conventional panoramic or 360° camera without requiring the expensive and bulky hardware of the panoramic or 360° camera. Thus, the remote video feed fusion system may receive input from the remote participant that changes a view within the fused video feed (e.g., changing a pan, tilt, zoom, position, etc., of the video feed) and, thereafter, change the view within the fused video feed for the remote participant based upon the input received by the remote participant. Changing the view for this remote participant does not change the view for other participants, meaning that each participant can be looking at a different view of the video feed simultaneously.

Figure 4:
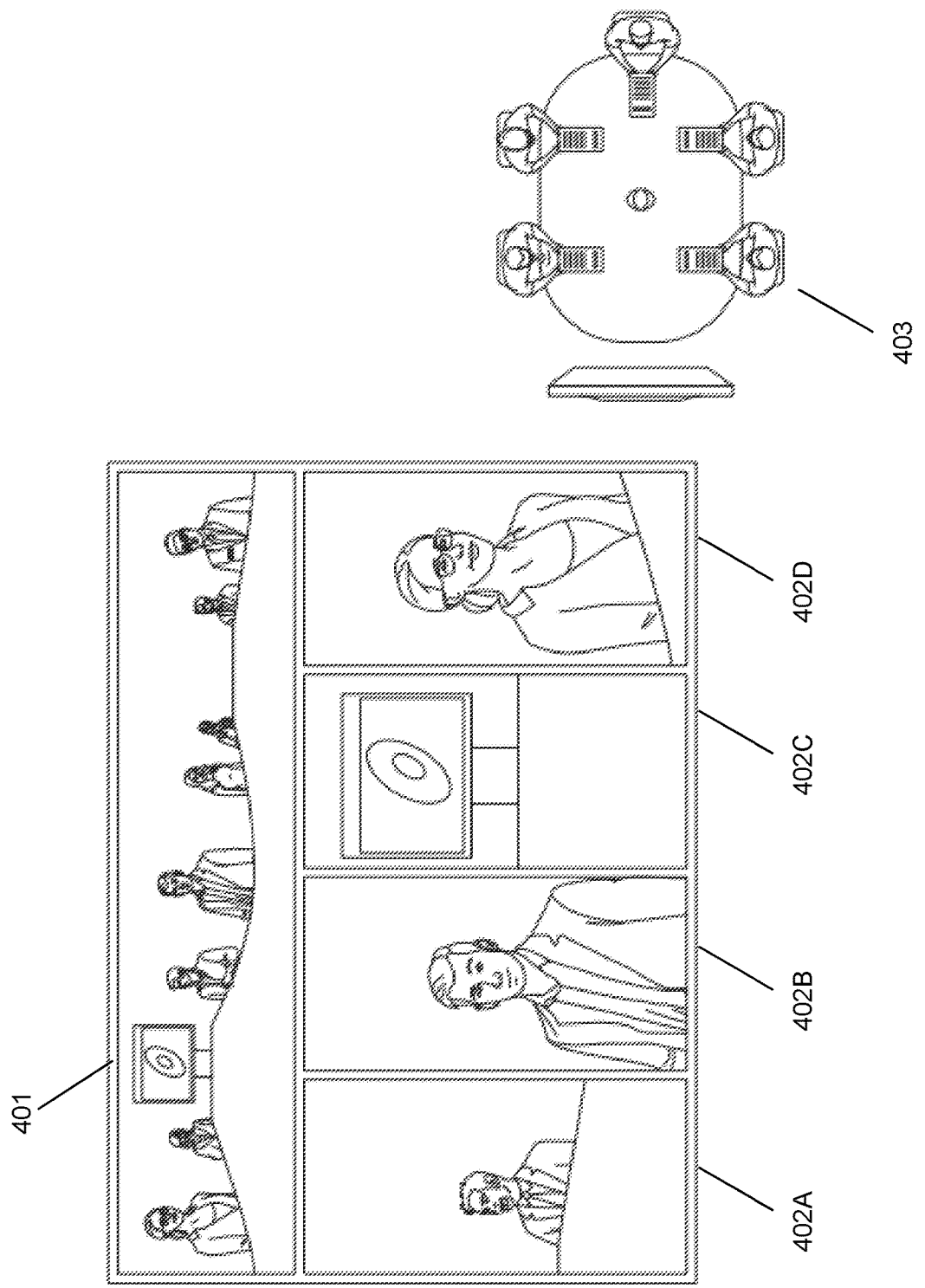
FIG. 4 illustrates an example of a plurality of video feeds captured from different devices.

FIG. 4 illustrates an example of a conference room setting 403 having a plurality of users who may each have a device. Additionally, the conference room itself may have corresponding devices. The overhead view of the conference room setting 403 shows an example setup of the meeting room. The image of 401 illustrates an example of a traditional video feed from a stationary camera. The images of 402A-402D illustrate example video feeds that may be captured from devices. As can be seen from these images, the video feeds 402A-402D are of different fields of view within the location, have different video attributes, and the like.

Figure 5:
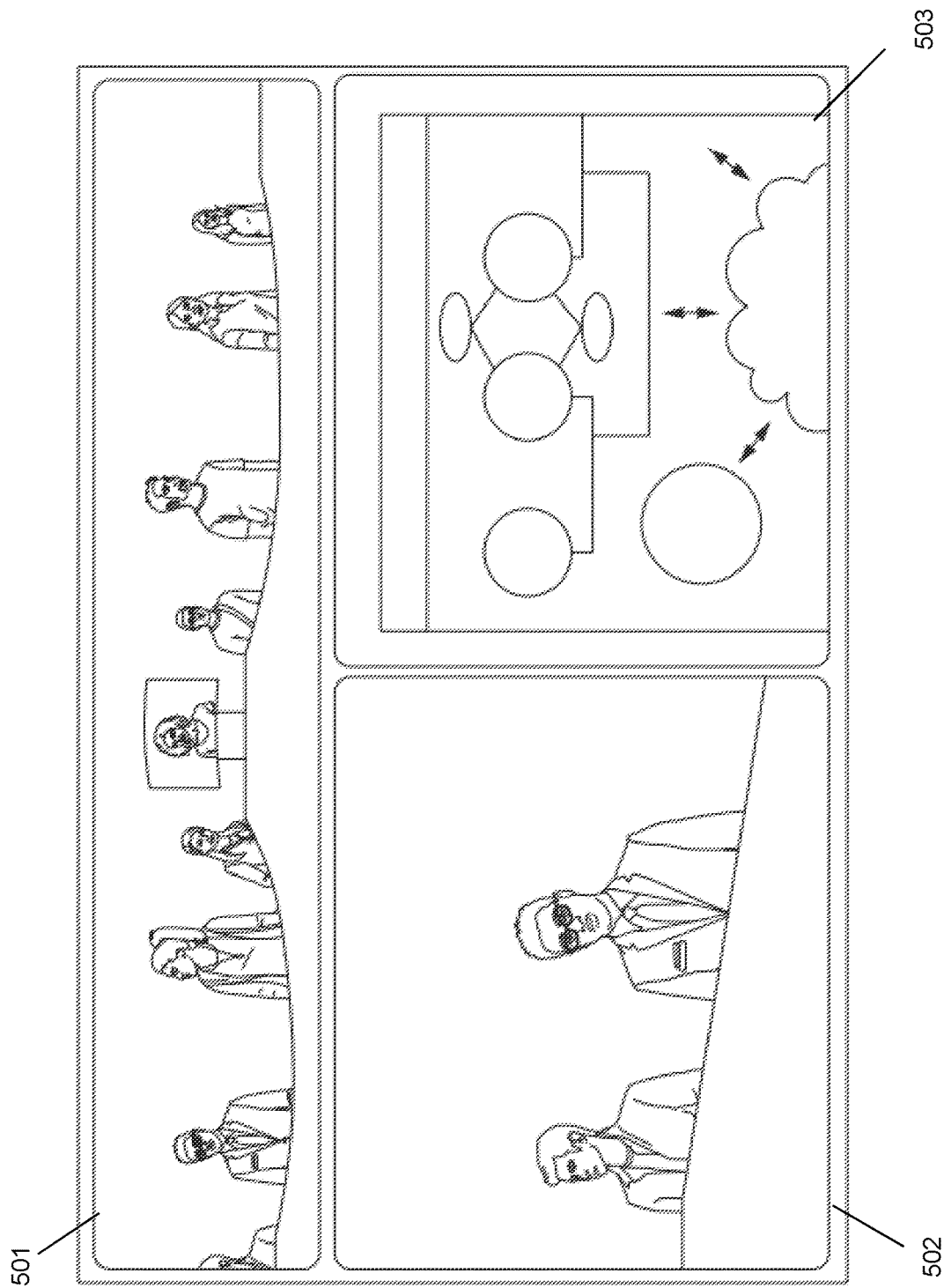
FIG. 5 illustrates an example of a fused video feed and video feed views selected by a remote participant.

FIG. 5 illustrates an example fused video feed at 501. This is the video feed that may be created from the different video feeds captured by the different devices as illustrated in FIG. 4. The remote participant can also select one or more views to be viewed either separately or simultaneously with other views and/or the fused video feed. Such view selections are illustrated at 502 and 503. In this illustration, the selected views 502 and 503 are shown simultaneously with the fused video feed 501. However, it should be noted that a single view may be shown, more views may be shown, and/or the like. All of these options may be default selections or configured by the user.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
   receiving, at a remote video feed fusion system, an indication of a meeting facilitated through a meeting application allowing access to participants in a location other than a location of a host of the meeting and supporting video transmissions between connected participants;

identifying, using the remote video feed fusion system, a plurality of devices each having at least one image capture device and within the location of the host;

capturing, using the remote video feed fusion system, a plurality of video feeds of the location of the host using the plurality of devices;

creating, using the remote video feed fusion system, a fused video feed of the location of the host from the plurality of video feeds, wherein the creating comprises ignoring attributes of the plurality of video feeds and stitching the fused video feed based upon image areas of the plurality of video feeds, wherein identifying images areas of the plurality of video feeds to be stitched together comprises identifying at least one attribute of a device corresponding to at least one of the plurality of video feeds based upon information captured in real-time from the device; and transmitting, using the remote video feed fusion system, the fused video feed to at least one participant accessing the meeting from a location other than the location of the host.

2. The method of claim 1, wherein the plurality of devices comprises at least one user device.

3. The method of claim 1, wherein a position of one or more of the plurality of devices is dynamic.

4. The method of claim 1, wherein a position of the one or more of the plurality of devices within the location of the host is not known.

5. The method of claim 1, wherein the creating comprises identifying image areas of overlap between two or more of the plurality of video feeds and stitching the video feeds together based upon the image areas of overlap.

6. The method of claim 1, wherein the attributes of the plurality of video feeds comprise at least one attribute selected from the group consisting of: field of view, resolution, saturation, image coloring, size, and display ratio.

7. The method of claim 1, wherein the creating comprises determining image areas of the plurality of video feeds to be stitched together by identifying one or more attributes of a device of the plurality of devices providing a corresponding of the plurality of video feeds.

8. The method of claim 1, wherein the capturing, creating, and transmitting occur in substantially real-time as the meeting is occurring.

9. The method of claim 1, comprising, receiving at the remote video feed fusion system and from the at least one participant, input changing a view within the fused video feed; and changing the view within the fused video feed for the at least one participant, wherein the changing the view for the least one participant does not change a view of other participants of the meeting.

10. An information handling device, the information handling device comprising:

a plurality of devices, each having at least one image capture device;

a processor operatively coupled to the plurality of devices;

a memory device that stores instructions that, when executed by the processor, causes the information handling device to:

receive, at a remote video feed fusion system, an indication of a meeting facilitated through a meeting application allowing access to participants in a location other than a location of a host of the meeting and supporting video transmissions between connected participants;

identify, using the remote video feed fusion system, the plurality of devices within the location of the host;

capture, using the remote video feed fusion system, a plurality of video feeds of the location of the host using the plurality of devices;

create, using the remote video feed fusion system, a fused video feed of the location of the host from the plurality of video feeds, wherein the creating comprises ignoring attributes of the plurality of video feeds and stitching the fused video feed based upon image areas of the plurality of video feeds, wherein identifying images areas of the plurality of video feeds to be stitched together comprises identifying at least one attribute of a device corresponding to at least one of the plurality of video feeds based upon information captured in real-time from the device; and transmit, using the remote video feed fusion system, the fused video feed to at least one participant accessing the meeting from a location other than the location of the host.

11. The information handling device of claim 10, wherein the plurality of devices comprises at least one user device.

12. The information handling device of claim 10, wherein a position of one or more of the plurality of devices is dynamic.

13. The information handling device of claim 10, wherein a position of the one or more of the plurality of devices within the location of the host is not known.

14. The information handling device of claim 10, wherein the creating comprises identifying image areas of overlap between two or more of the plurality of video feeds and stitching the video feeds together based upon the image areas of overlap.

15. The information handling device of claim 10, wherein the creating comprises determining image areas of the plurality of video feeds to be stitched together by identifying one or more attributes of a device of the plurality of devices providing a corresponding of the plurality of video feeds.

16. The information handling device of claim 10, wherein the capturing, creating, and transmitting occur in substantially real-time as the meeting is occurring.

17. The information handling device of claim 10, comprising, receiving at the remote video feed fusion system and from the at least one participant, input changing a view within the fused video feed; and changing the view within the fused video feed for the at least one participant, wherein the changing the view for the least one participant does not change a view of other participants of the meeting.

18. A product, the product comprising:

a computer-readable storage device that stores executable code that, when executed by a processor, causes the product to:

receive, at a remote video feed fusion system, an indication of a meeting facilitated through a meeting application allowing access to participants in a location other than a location of a host of the meeting and supporting video transmissions between connected participants;

identify, using the remote video feed fusion system, a plurality of devices each having at least one image capture device and within the location of the host;

capture, using the remote video feed fusion system, a plurality of video feeds of the location of the host using the plurality of devices;

create, using the remote video feed fusion system, a fused video feed of the location of the host from the plurality of video feeds, wherein the creating comprises ignoring attributes of the plurality of video feeds and stitching the fused video feed based upon image areas of the plurality of video feeds, wherein identifying images areas of the plurality of video feeds to be stitched together comprises identifying at least one attribute of a device corresponding to at least one of the plurality of video feeds based upon information captured in real-time from the device; and transmit, using the remote video feed fusion system, the fused video feed to at least one participant accessing the meeting from a location other than the location of the host.

\* \* \* \* \*